United States Patent
Grefenstette

(10) Patent No.: US 7,437,336 B2
(45) Date of Patent: Oct. 14, 2008

(54) POLYOPTIMIZING GENETIC ALGORITHM FOR FINDING MULTIPLE SOLUTIONS TO PROBLEMS

(75) Inventor: John Grefenstette, Fairfax Station, VA (US)

(73) Assignee: George Mason Intellectual Properties, Inc., Fairfax, VA (US)

( * ) Notice: Subject to any disclaimer, the term of this patent is extended or adjusted under 35 U.S.C. 154(b) by 110 days.

(21) Appl. No.: 10/901,958

(22) Filed: Jul. 30, 2004

(65) Prior Publication Data

US 2005/0038762 A1 Feb. 17, 2005

Related U.S. Application Data

(60) Provisional application No. 60/491,529, filed on Aug. 1, 2003.

(51) Int. Cl.
*G06N 5/00* (2006.01)
(52) U.S. Cl. .................................. 706/13; 706/4; 703/6
(58) Field of Classification Search .................. 706/13, 706/4; 703/6
See application file for complete search history.

(56) References Cited

U.S. PATENT DOCUMENTS 5,940,816 A * 8/1999 Fuhrer et al. ................. 706/13
6,243,694 B1 * 6/2001 Bonissone et al. ............ 706/4
6,360,191 B1 * 3/2002 Koza et al. ..................... 703/6

OTHER PUBLICATIONS

Keijzer, et al, Dimensionally Aware Genetic Programming, GECCO-99: Proceedings of the Genetic and Evolutionary Computation Conference, Jul. 13-17, 1999, pp. 1-8.*

* cited by examiner

*Primary Examiner*—Wilbert L Starks, Jr.
(74) *Attorney, Agent, or Firm*—David Yee; David G. Grossman

(57) ABSTRACT

A method and system for finding a multiple solutions to a problem is disclosed. The method includes: modeling a problem as an objective function, generating a multitude of candidate solutions for said objective function; and determining a set of acceptable and distinct solutions. The objective function is capable of mapping structures in a search space. The search space includes a multitude of points. For each of said candidate solutions at each of said multitude of points, the set of acceptable and distinct solutions are determined by: calculating a fitness using the objective function; assigning each fitness to its candidate solution; transforming the fitness using a penalty function; determining if the candidate solution is acceptable; determining if the candidate solution is sufficiently distinct; and adding the candidate solution to the set of acceptable and distinct solutions if the candidate solution was determined to be acceptable and distinct.

39 Claims, 11 Drawing Sheets

```
procedure EA (input: time limit T)
t= 0;
initialize population P(t);
evaluate fitness of P(t);
whilet <T do
        t = t+1;
        select clones P(t) from P(t-1);
        recombine and mutate P(t);
        evaluate fitness of P(t);
end
```

FIG. 1

```
/*****************************************************
Key variables:
  x = current point being evaluated (2-dimensional).
  old_fitness = fitness of x before penalty.
  new_fitness = fitness of x after penalty.
  A = penalty for a direct hit on a previous point.
  B = maximum distance at which a penalty will be applied.
*****************************************************/
double fitness(x, old_fitness)
{
  /* positions of nine grid points surrounding x */
  i_min = lower_bound(x[0] - Delta);
  i_max = upper_bound(x[0] + Delta);
  j_min = lower_bound(x[1] - Delta);
  j_max = upper_bound(x[2] + Delta);
  /* initialize penalty */
  penalty = 0.0;
  for (i = i_min; i < i_max; i++) {
    for (j = j_min; j < j_max; j++) {
      /* get start of list associated with this grid element */
      old_point = get_first_element_in_grid(i, j);
      while (old_point) {
        /* determine distance between x and previous point */
        d = distance(x, old_point);
        /* apply quadratic penalty */
        if (d < B){
          penalty += A*(1.0 - (d*d)/(B*B));
        }
        old_point = get_next_element_in_grid(i, j);
      }
    }
  }
  new_fitness = old_fitness - penalty;
  return(new_penalty);
}
```

FIG. 8

POLYOPTIMIZING GENETIC ALGORITHM FOR FINDING MULTIPLE SOLUTIONS TO PROBLEMS

CROSS-REFERENCE TO RELATED APPLICATIONS

The present application claims the benefit of provisional patent application: Ser. No. 60/491,529 to Grefenstette, filed on Aug. 1, 2003, entitled "Method of Finding Multiple Solutions to Problems," which is hereby incorporated by reference.

BACKGROUND OF THE INVENTION

The present invention relates to the field of problem solving. Specifically, the present invention relates to computational systems and methods that actively seek multiple, distinct solutions to a given objective function.

A standard approach to problems in science and engineering is to pose the problem as a mathematical optimization problem, and to use an optimization method for finding the nest solution. A usual method is to formulate an objective function that measures the quality of possible solutions. In some cases, the objective function may be solved analytically; in many other cases, a computational algorithm is required to find the best solution. Many practical problems are intractable in the sense that there is no feasible way to find the optimal solution. In these cases, one must settle for suboptimal solutions. Many important problems share the additional characteristic that finding a single solution may not be sufficient.

An example of such a problem relates to protein folding. Recent developments have suggested that multiple alternative solutions to the protein folding problem may be of interest for some proteins. The proteins involved in protein conformational disorders, such as Alzheimer's disease, Huntington disease, cystic fibrosis, amyotropic lateral sclerosis, share the ability to adopt multiple different stable conformations. What is needed is an algorithm that reports all likely protein conformations. Many other problems in computational biology have multiple solutions of interest. For example in molecular docking problems, there may be several suitable docking sites for a given pair of molecules. Identifying a set of distinct binding sites would permit a more thorough analysis of possible in vivo effects of a given drug candidate, as well as the selection of candidates based on the total number of possible binding modalities. In phylogenetic analysis, it has been shown that many sequences have multiple optimal maximum-likelihood trees. Such data sets support two or more significantly different phylogenies. Finding a set of distinct near-optimal trees would enable the biologist to integrate the analysis based on molecular data with other forms of information (e.g., morphology, habitat, etc.), providing a more comprehensive analysis of all the available data.

The need to identify multiple solutions obviously extends beyond problems in computational biology. Examples could be drawn from nearly any area of science or engineering. For examples, in design optimization, an engineer may be interested in finding all equally good designs. A knowledge analyst may be interested in finding all sufficiently "interesting" patterns in a large data set. If "solutions" to the objective function correspond to failure modes, then finding all solutions is often a critical requirement, as the next two examples illustrate.

A test engineer may need to identify all failure modes for a complex device such as an airplane or submarine. Given a suitably realistic simulation of the device and its environment, it is possible to design intelligent test systems that systematically explore the effects of environmental conditions and potential combinations of system faults. Casting this as an optimization problem requires an objective function that measures both the probability of the environmental conditions and the severity of the resulting system failure. In a previous study, an intelligent test method based on a genetic algorithm (GA) was developed to find potential failure modes for autonomous vehicles. (See A. C. Schultz, J. J. Grefenstette, and K. A. De Jong., Test and evaluation by genetic algorithms, IEEE Expert, 8(5):9-14, 1993). A standard GA was able to identify unforeseen failure modes, but was not designed to completely explore the space of system failures. An approach that could identify all distinct failure modes would significantly improve the process of ensuring the reliability of the complex systems being tested.

A similar approach may be applied to problems in homeland defense. For example, suppose one is trying to find the best way to protect a given resource, say, a city's transportation infrastructure, from terrorist attack. One approach is to play "devil's advocate" and find the most effective way that a potential terrorist might disrupt the transportation network, and then to design appropriate protective measures. However, this approach might leave the "second-best" terrorist attack plan undefended. Of course, one could just repeat the devil's advocate analysis again, but a more systematic approach would try to identify all possible attack routes before starting to plan the best defense.

As these examples suggest, what is needed is a broad application for computational systems and methods designed to actively seek multiple, distinct solutions to a given objective function.

BRIEF SUMMARY OF THE INVENTION

One advantage of the present invention is that it capable of systematically finding multiple distinct solutions to complex problems.

Another advantage of this invention is that it may be applied to numerous problems in science and engineering, including engineering optimization, adaptive testing, homeland security analysis, and problems in computational biology including protein folding and drug design.

A further advantage of this invention is that it uses principles from Darwinian evolution to generate high performance solutions to complex optimization problems.

A further advantage of this invention is that it may be applied to multiple-objective problems.

To achieve the foregoing and other advantages, in accordance with all of the invention as embodied and broadly described herein, a method for finding a multiple solutions to a problem is disclosed. The method includes: modeling a problem as an objective function, generating a multitude of candidate solutions for said objective function; and determining a set of acceptable and distinct solutions. The objective function is capable of mapping structures in a search space. The search space includes a multitude of points. For each of said candidate solutions at each of said multitude of points, the set of acceptable and distinct solutions are determined by: calculating a fitness using the objective function; assigning each fitness to its candidate solution; transforming the fitness using a penalty function; determining if the candidate solution is acceptable; determining if the candidate solution is sufficiently distinct; and adding the candidate solution to the set of acceptable and distinct solutions if the candidate solution was determined to be acceptable and distinct.

In yet a further aspect of the invention, a method for finding a multiple solutions to a problem including the calculation of an efficiency metric, wherein the calculation considers the number of acceptable and distinct solutions found in the search space and the number of points evaluated.

In yet a further aspect of the invention, a system for finding multiple solutions to a problem is disclosed. The system includes a problem modeler, a candidate solution generator, and a set of acceptable and distinct solutions generator. The problem modeler is capable of modeling a problem as an objective function, wherein the objective function is capable of mapping structures in a search space that includes a multitude of points. The candidate solution generator is capable of generating a multitude of candidate solutions using the objective function. For each of the candidate solutions at each of the multitude of points, the set of acceptable and distinct solutions generator: calculates a fitness using the objective function; assigns each fitness to its candidate solution; transforms the fitness using a penalty function; determines if the candidate solution is acceptable; determines if the candidate solution is sufficiently distinct; and then adds the candidate solution to a set of acceptable and distinct solutions if the candidate solution was determined to be acceptable and distinct.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

BRIEF DESCRIPTION OF THE SEVERAL VIEWS OF THE DRAWINGS

The accompanying drawings, which are incorporated in and form a part of the specification, illustrate an embodiment of the present invention and, together with the description, serve to explain the principles of the invention.

FIG. 1 shows an example of a basic evolutionary algorithm.

FIG. 8 shows an example of pseudo-code implementing a dynamic penalty function.

DETAILED DESCRIPTION OF THE INVENTION

The present invention involves a new class of evolutionary algorithms, called poly-optimizing genetic algorithms (POGAs), that systematically finds multiple distinct solutions to complex problems. POGAs locate multiple distinct solutions during a single execution of the algorithm, and operate by imposing a dynamic penalty function on the fitness landscape derived from the original objective function.

Figure 2:
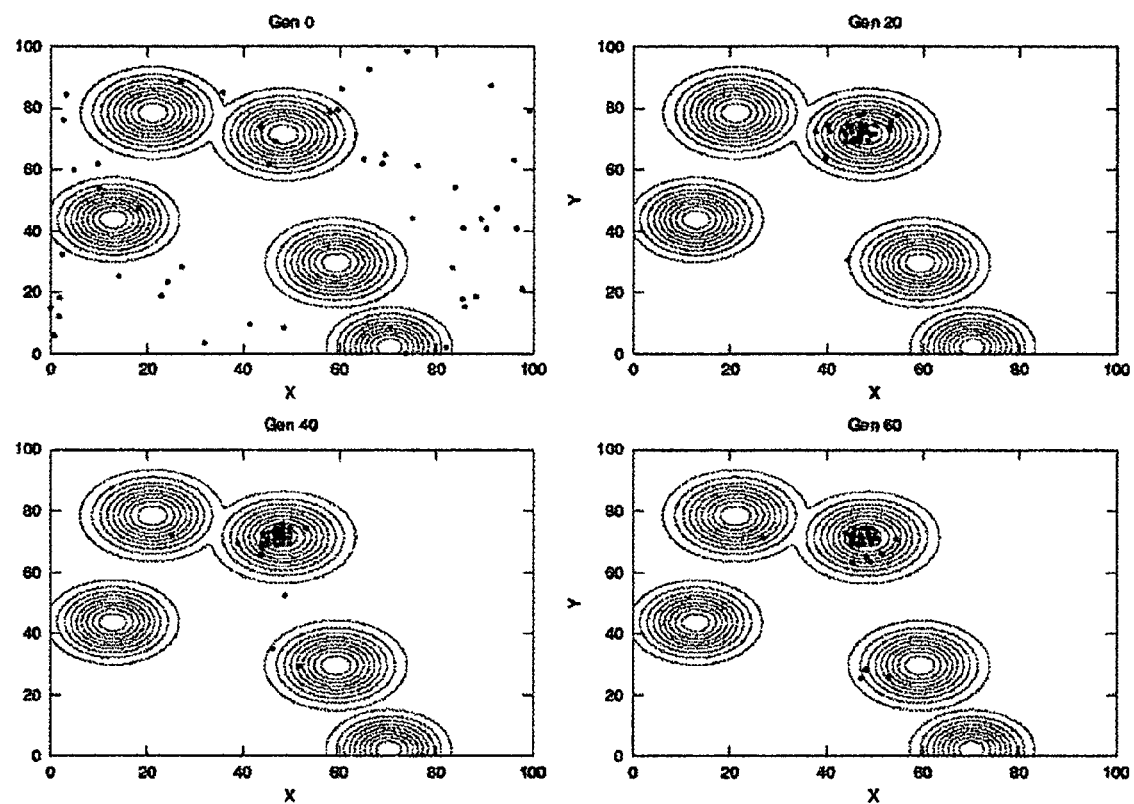
FIG. 2 shows the behavior of standard GA on a simple test problem.

Genetic Algorithms: Evolutionary algorithms, including genetic algorithms (see John H. Holland, *Adaptation in Natural and Artificial Systems: An Introductory Analysis with Applications to Biology, Control and Artificial Intelligence,* Univ. of Mich. Press, 1975), evolutionary programming (see David B. Fogel, *Evolutionary Computation,* IEEE PRESS, 1995), and evolution strategies (see I. Rechenberg, *Cybernetic Solution Path Of An Experimental Problem,* Library Translation 1122, Royal Aircraft Establishment, Farnborough, Hants, August 1965, 1964), are heuristic global optimization methods based on principles drawn from natural evolution and selective breeding. An example of a basic evolutionary algorithm is shown in FIG. 2.

The key feature that distinguishes an evolutionary algorithm from other methods is that evolutionary algorithms maintains a population of candidate solutions that compete for survival. Idealized genetic search operators alter selected structures in order to create new structures for further testing. The interaction of selection pressure with the exploration produced by the recombination and mutation operators enables the evolutionary algorithm to rapidly improve the average fitness of the population and to quickly identify the high performance regions of very complex search spaces.

Approaches vary across the different classes of evolutionary algorithms: genetic algorithms often stress the importance of recombination over mutation; evolutionary programming usually favors heuristically derived mutation operators over recombination; and evolution strategies generally stress the use of self-adaptive mutation rates. The term genetic algorithm (GA) is used throughout this disclosure; however, one of average skill in the art will recognize that the essential idea disclosed may be applied with minor variations to any of the evolutionary algorithm paradigms.

The specific methods involved in selection, recombination and mutation provide a broad range of specific implementations. The initial population may be chosen at random, or selected on the basis of heuristics. Methods for selecting clones include proportional fitness, rank selection, and tournament selection. (See, John J. Grefenstette. *Proportional selection and sampling algorithms,* in *Handbook of Evolutionary Computation,* chapter C2.2, IOP Publishing and Oxford Univ. Press, 1997; see also John J. Grefenstette, *Rank-Based Selection,* in *Handbook of Evolutionary Computation,* chapter C2.4, IOP Publishing and Oxford University Press, 1997). Recombination operators include single and multi-point crossover, uniform crossover, and various problem specific operators. A wide range of static and adaptive mutation operators has been developed. In practice, genetic algorithms are often combined with local search techniques to create high-performance hybrid search algorithms. (For a survey of genetic algorithms, see Melanie Mitchell, An Introduction to Genetic Algorithms, MIT Press, 1996).

Poly-Optimizing Genetic Algorithms: The present invention extends the genetic algorithm paradigm to the problem of finding multiple distinct solutions to complex optimization problems. It is assumed that the user is interested in finding as many distinct, near-optimal solutions as possible. These requirements are addressed by a new class of genetic algorithms, called poly-optimizing genetic algorithms (POGA). In a POGA, the fitness assigned to a candidate solution may be determined in part by the set of points visited previously by the algorithm. By means of a dynamic penalty function, the fitness of a point may be reduced if it is sufficiently similar to previously visited points. (Dynamic penalty functions have been previously used in genetic algorithms for constrained optimization problems, but the goal in that context is to change the fitness associated with the infeasible regions, not to find multiple alternative solutions. See Zbigniew Michalewicz and Marc Schoenauer, *Evolutionary algorithms for constrained parameter optimization problems*, EVOLUTIONARY COMPUTATION 4(1):1-32, 1996.). As a result, the algorithm may be expected to shift its focus to alternative regions of the search space, looking for alternative solutions as it proceeds. All acceptable solutions may be recorded for further analysis.

Let g: X→R be the objective function that maps structures in search space X into the reals. One of the strengths of genetic algorithms is that they require very few assumptions about the search space X or the objective function g(x). Genetic algorithms have been applied to search spaces represented by n-dimensional numerical vectors, arbitrary bit-strings, combinatorial objects such as permutations and trees, and spaces of logical rules and computer programs. The objective function g may be high-dimensional, multimodal, and discontinuous. To make the discussion clear, it is assumed here that g is to be maximized.

Let a distance metric d: X→R be defined over the search space X, such that $d(x_i, x_j)$ is the distance between search points $x_i$ and $x_j$. The distance metric may be defined by the user in order to determine whether alternative solutions are sufficiently distinct to meet the user's needs.

A poly-optimization problem may be defined by a quintuple (X, g, d, δ, ε) where the goal is to find a maximal set $$H = \{X_i \epsilon X | g(x_i) \geq \epsilon \text{ and } d(x_i, x_j) \geq \delta \text{ for all } x_j \epsilon H, j \neq i\} \quad (1)$$

That is, it is desired to find as many distinct, acceptable solutions as possible, where a solution is acceptable if its objective function value is at least ε, and two solutions are distinct if the distance between them is at least δ.

Given this operational definition, a natural efficiency metric for poly-optimization algorithms is the hit rate h(t) defined as the size of set $H_t$ of acceptable, distinct solutions found by time t, where t refers to the number of points from X evaluated so far. Other definitions are possible. For example, the relative quality of the points in $H_t$ could be including the efficiency metric, since it is possible that a maximal set of solutions as defined above may not include the global optimum, whereas another smaller set would.

In a POGA, the fitness of each point evaluated during the search will be transformed by a dynamic penalty function. There are several options for how a dynamic penalty function might be defined and implemented in a POGA. Let ƒ(x,t) be the fitness function at time t. The fitness function is used by the genetic algorithm to decide which members of the current population will be selected to generate offspring in the next generation. In a POGA, $$f(x, t) = g(x) - p(x, t) \quad (2)$$

where g(x) is the objective function that defines the underlying optimization problem and p(x,t) is the penalty function at time t. (It is common practice to scale the fitness function to maintain selective pressure. See John J. Grefenstette, *Optimization of control parameters for genetic algorithms*, IEEE TRANSACTIONS ON SYSTEMS, MAN & CYBERNETICS, SMC-16(1): 122-128, January-February 1986. In a sense, the dynamic penalty function generalizes the notion of scaling in standard genetic algorithms.). The penalty function p(x, t) may be defined in terms of a pairwise penalty function r(u, v) that computes the penalty to be applied to point u based on the previously visited point v.

The definition of dynamic penalty functions can vary along several dimensions, including:
 the definition of distance metric;
 the form of pairwise penalties;
 absolute vs. relative penalties; and
 the number of neighbors contributing to penalties.

Distance metric: The ability to find distinct solutions to a problem presupposes a distance metric that can indicate how far apart two solutions are. Recall that genetic algorithms represent candidate solutions in a variety of "genotypic" data structures, including bit strings, real-valued vectors, permutations, and other structures. In many cases, these representations have natural distance measures such as: Hamming distance for bit strings, Euclidean distance for real-valued vectors, and edit distances for permutations. For specific problems, domain-specific distance measures may be defined. For example, a tree-coordinate system has been proposed that yields a natural distance metric for phylogenetic trees in computational biology. (See Persi W. Diaconis and Susan P. Holmes, *Matchings and phylogenetic trees*, PROC NATL ACAD SCI USA, 1998). For protein folding and molecular docking, it may be more informative to measure the structural distance between the corresponding "phenotype," i.e., the RMS distance between the corresponding atoms, rather than the Euclidean distance between the "genotypes" consisting of the dihedral bond angles.

Pairwise Penalty: The intended result of the dynamic penalty function is to reduce the fitness in the vicinity of previously explored regions of the search space. A pairwise penalty function may be defined by specifying the size of the penalty for a direct hit and decrease in the penalty as a function of distance. For example, let A be the penalty for direct hit on previously visited point, and let B be the maximum distance at which a pairwise penalty applies. Then one could consider pairwise penalties of several forms, for example:

$$\text{Linear: } r(u, v) = A*(1 - d(u, v)/B) \quad (3)$$

$$\text{Quadratic: } r(u, v) = A*(1 - (d(u, v)/B)^2) \quad (4)$$

among others. Additional forms of pairwise penalty function can be envisioned.

Absolute vs. Relative Penalties: The dynamic penalties may be absolute, as in:

$$f(x, t) = g(x) - p(x, t) \quad (5)$$

or relative to the value of the objective function at the point in question, as in:

$$f(x, t) = g(x)*(1 - p(x, t)) \quad (6)$$

In the latter case, the range of p(x,t) would be restricted to [0 ... 1].

For either types of penalties, it may be unnecessary to penalize points whose objective function values are far from optimal. If it is sufficient to penalize only points in the region of acceptable solutions (i.e., those with high value) then the implementation of the dynamic penalty function could be made more efficient, since no comparisons with previously visited points would be required for most of the search space.

All Neighbors vs Nearest Neighbors: The number of neighbors that are taken into account in computing the pairwise penalty may vary. At one extreme, the penalty function might include only the penalty associated with the nearest neighbor:

$$p(x_t, t) = \max r(x_t, x_i) \text{ for } i = 0 \ldots t-1 \quad (7)$$

where $x_i$ is the point visited at time i. Alternatively, the penalty function might be summed over all previously visited points:

$$p(x_t, t) = \Sigma r(x_t, x_i) \text{ for } i = 0 \ldots t-1 \quad (8)$$

Implementation Issues: The standard genetic algorithm preferably maintains a fixed-size population of structures, so memory requirements are usually modest. In a POGA, additional information may be stored, perhaps as much as a history of every point visited during the search. Using standard population sizes, this should not be a problem on current computers. Nevertheless, it is desirable to consider methods that achieve the same goal without necessarily storing all visited points. The overhead in computation time required to implement the dynamic fitness function is another concern. As one example, in the POGA the fitness of each point may be reduced by the presence of previously visited points within a δ-neighborhood. By using appropriate data structures to store the previously visited points, it should be possible to compute the penalty value by considering a relatively small fraction of previously visited points. The time spent computing the dynamic penalty function will generally be problem dependent, but is expected to add an acceptable increment to the total runtime of the algorithm, especially in problems dominated by the evaluation of the objective function (such as protein folding, or maximum likelihood calculation in phylogenetic analysis).

Proof of Concept: A description of a study of a POGA approach undertaken to examine the basic feasibility and utility of the approach will now be described. The starting point for this study was a standard genetic algorithm that includes the basic routines for selection, recombination and mutation. This standard GA was extended with a dynamic penalty function based on all previously visited points within a δ-neighborhood (Eq. 8), with δ=1.

Figure 3:
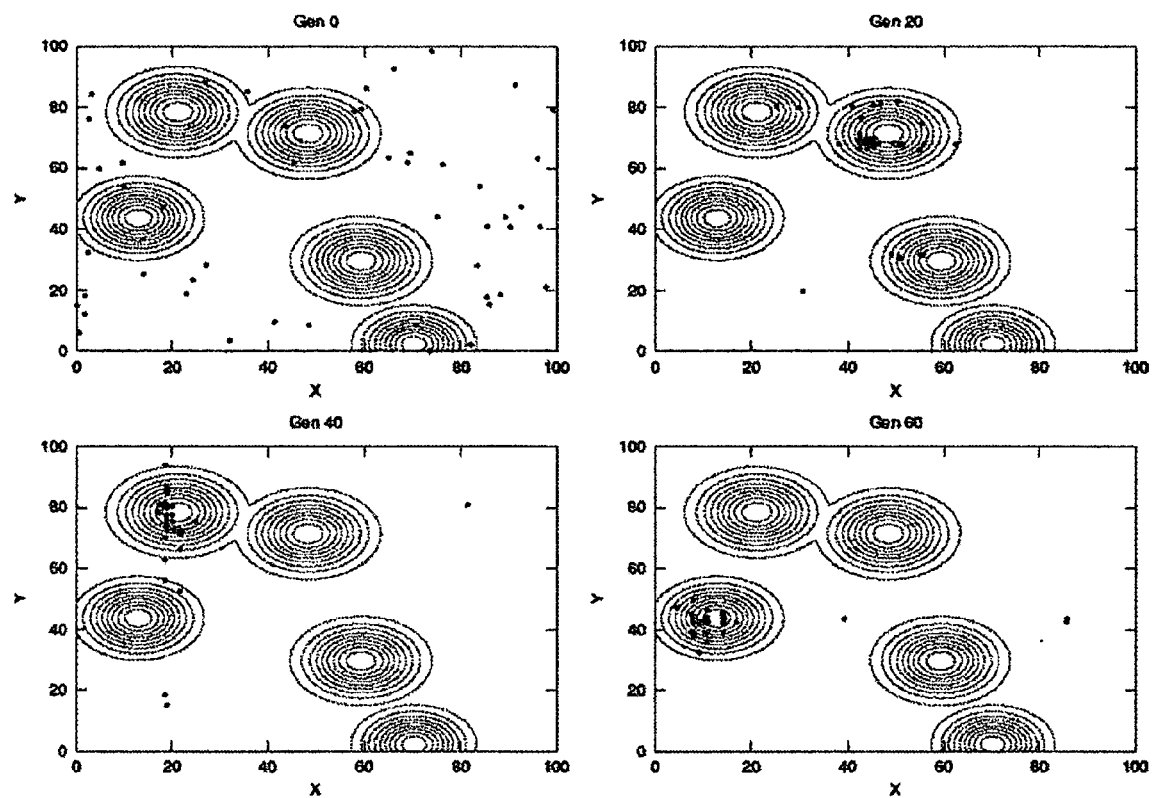
FIG. 3 shows the behavior of the preliminary POGA on a simple test problem.

To illustrate the differences between a standard genetic algorithm and a poly-optimizing genetic algorithm, both algorithms were run on a two-dimensional test function defined on the domain [0 ... 100, 0 ... 100]. The objective function contained five separate global optima. FIG. 2 shows the distribution of members of the current population in the standard genetic algorithm on a contour plot of the problem at 20-generation intervals. (For all test problems in this section, the genetic algorithm used a bit-string representation of 20 bits per dimension, giving a total search space of $2^{40}$ points. For each dimension, the 20 bit string was translated to an integer by a Gray code and mapped into the range 0 ... 100. The GA and POGA both used a population size of 50, crossover 0.5, and mutation rate 0.025.) As expected, the standard GA quickly identifies one of the global optima and converges to its region of the search space. FIG. 3 shows the behavior of the preliminary POGA on the same problem. This algorithm also quickly identified one optimum, but in response to the dynamic penalty function, it continued to explore the search space, identifying multiple optima over the same 60 generations.

Figure 4:
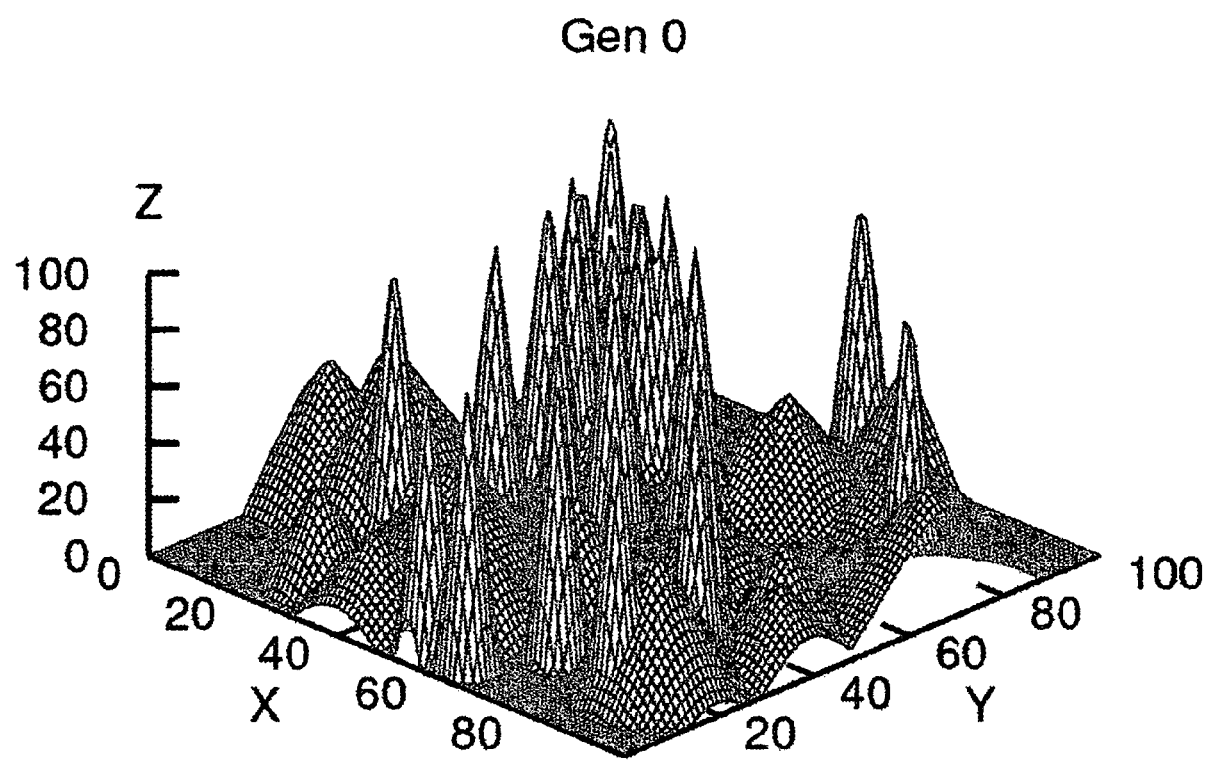
FIG. 4 shows a typical landscape in the test suite.

To quantify the performance of a POGA relative to other methods, a test suite of 100 objective functions over the same two-dimensional domain was defined. Each test problem consisted of 20 randomly distributed global optima surrounded by conic peaks with slope 5.0 and 20 randomly distributed suboptimal peaks surrounded by conic peaks of variable widths. The objective function is defined as the maximum of all 40 peaks in the domain. Each global optimum had a value of 100. The acceptability parameter ε was set to 95; that is, a solution is acceptable if its objective function value is within 5 percent of the optimal objective function value. The separation parameter δ was set to 1.0; that is, each solution found must be at least 1.0 unit away from any other solution found. A quadratic pairwise penalty (Eq 4) was adopted, with A=5 and BR=1. Dynamic penalties were absolute (Eq 5). A typical landscape in the test suite is shown in FIG. 4.

Figure 5:
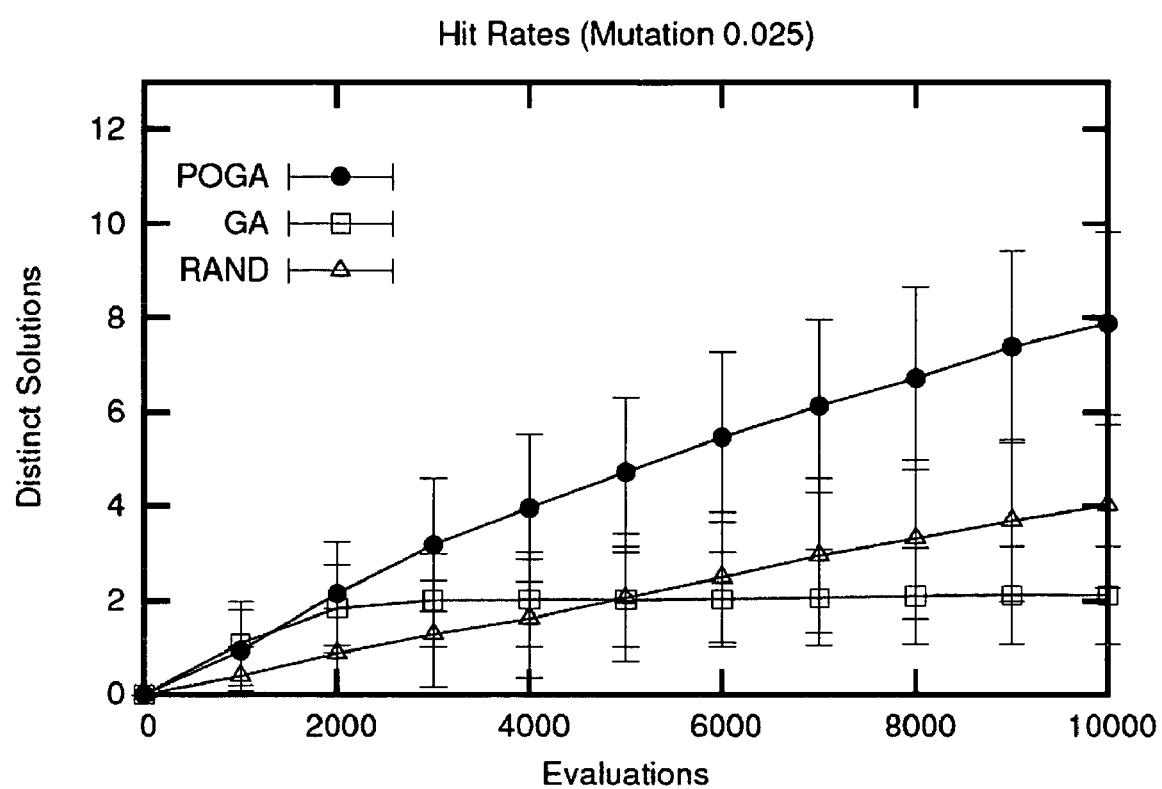
FIG. 5 shows a comparison of the mean hit rates of three algorithms.
Figure 6:
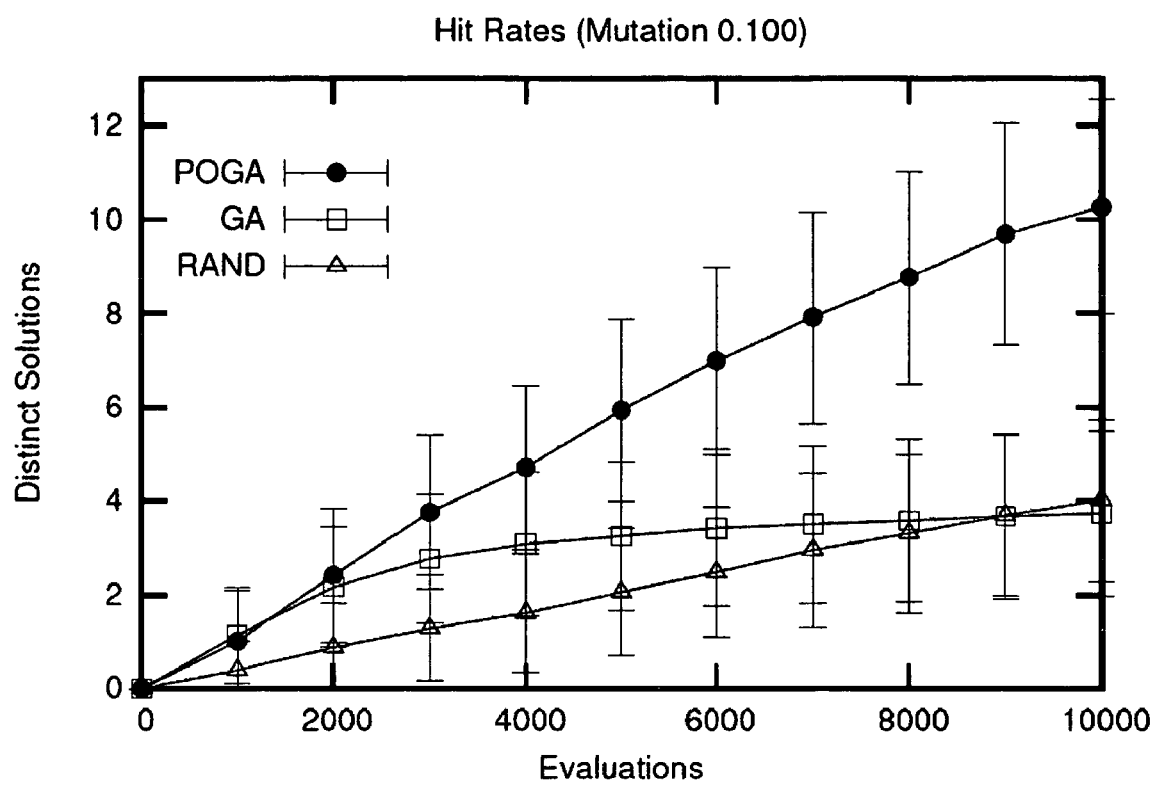
FIG. 6 shows results of a test suite with an increase mutation rate.

The hit rate H(t) may be defined as the number of distinct acceptable solutions generated by time t, where t measures the number of candidate solutions evaluated by the algorithm. FIG. 5 shows a comparison of the mean hit rates of three algorithms: a standard GA, a poly-optimizing GA, and a pure Monte-Carlo (random search) algorithm on a test set of 100 multiple-optima landscapes. The Monte-Carlo algorithm is included because it is a plausible alternative method for poly-optimization. The number of acceptable solutions found by a Monte-Carlo algorithm may be expected to increase at a rate that reflects the abundance of acceptable solutions in the search space, up to a point when no more solutions can be found that satisfy the separation parameter. In this study, the GA and POGA each used a mutation rate of 0.025. The errorbars in FIG. 6 show the standard deviation of the hit rate over the 100 test problems.

The standard GA performs as expected, with the number of distinct solutions found generally leveling off after a short period. The Monte-Carlo algorithm does better than the standard GA, continuing to find new solutions at a steady pace. The POGA finds on average more than twice as many distinct acceptable solutions as the standard GA. The POGA also performs significantly better than random search (at the 0.05 level of significance), showing its ability to not only effectively explore the space for multiple solutions, but to do so efficiently.

A number of parameters may be manipulated to improve the performance of the POGA method. For example, the results on the test suite when the mutation rate is increased to 0.1 is shown in FIG. 6. The higher mutation rate increasing the hit rate for both POGA and standard GAs, but the POGA still performs significantly better than both the GA and Monte-Carlo method.

Figure 7:
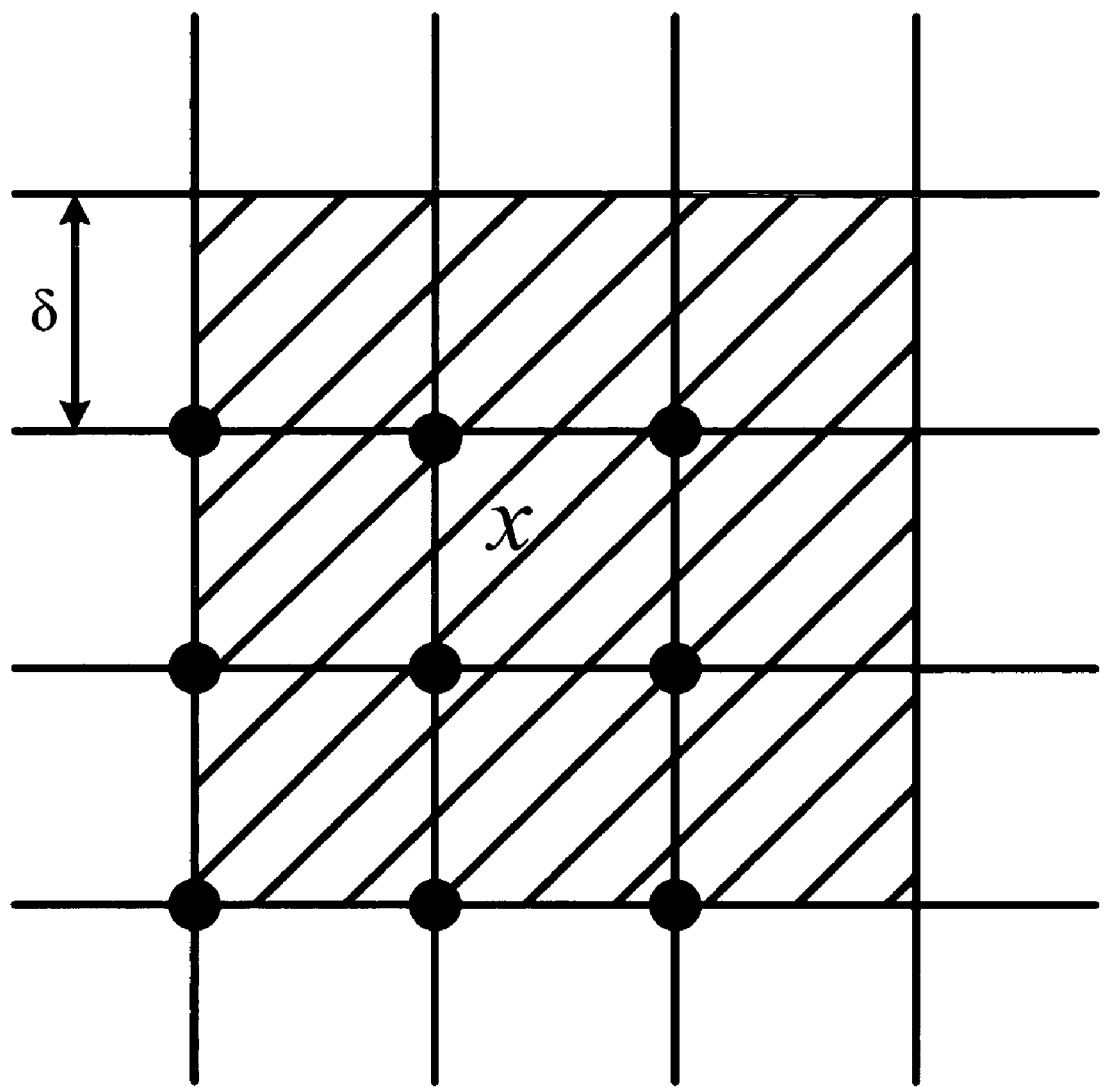
FIG. 7 shows an example neighborhood used by a penalty function.

The overhead of computing the dynamic penalty function may be a potential challenge for this approach. The proof-of-concept POGA used an efficient way to compare each point with previously visited points in the δ-neighborhood. As shown in FIG. 7, the two-dimensional domain may be partitioned by a grid of size δ, with a list indexed by the lower left corner of each cell storing all previously visited points drawn from that cell. To compute the penalty associated with the current point, x, requires finding the distance to all of its δ-neighbors. All such points may be stored in the lists associated with the nine indicated grid points, which together cover the shaded region. Since the overall search space covered an area of 100×100, and each grid list covered an area of $\delta^2$, where δ=1.0, each list contains at most 0.01% of the search space. Thus, the expected number of distance computations needed to compute the dynamic penalty function is expected to be less than 0.1% of the number of previously visited points.

Example pseudocode showing an implementation of a dynamic penalty function using this method is shown in FIG. 8. Using this approach, the additional overhead required to compute the dynamic penalty function may be negligible. A similar approach can be adopted to higher-dimensional spaces, using a sparse representation for the grid that explicitly stores only the non-empty lists.

Related Work: Genetic algorithms serve a natural basis for this approach, since they have been widely applied to the challenging problems in engineering and science. In computational biology, genetic algorithms are often the optimization method of choice in protein folding studies. Comparative studies show that genetic algorithm methods are competitive with other global optimization methods for de novo protein folding. For example, it has been shown that for molecules with more than eight rotatable bonds, the genetic algorithm is more efficient than the CSEARCH algorithm in Sybyl, and the relative efficiency of the genetic algorithm increases as the number of rotable bonds grows. (see R. S. Judson, E. P. Jaeger, A. M. Treasurywala, and M. L. Peterson, *Conformational searching methods for small molecules, ii. genetic algorithm approach*, JOURNAL OF COMPUTATIONAL CHEMISTRY, 14(11):1407-1414, 1993). Several molecular docking software systems feature genetic algorithm-based optimization, including AutoDock (available from The Scripps Research Institute in La Jolla Calif.), GOLD (available from the Cambridge Crystallographic Data Centre in Cambridge, UK), and STALK (developed at the Argonne National Laboratory in Argonne, Ill.). Applications of genetic search have also been used in the optimization of phylogenetic trees. (See P. O. Lewis, *A genetic algorithm for maximum-likelihood phylogeny inference using nucleotide sequence data*, Molecular Biology and Evolution 15(3):277-283, 1998.)

Existing methods have limited abilities to find distinct near-optimal solutions to difficult optimization problems. For example, one way to generate multiple solutions is to perform several runs of a local optimization method from different starting points. (See D. L. Swofford, *PAUP, Phylogenetic Analysis Using Parsimony, Version* 3.1, ILLINOIS NATURAL HISTORY SURVEY, 1993). This method has two shortcomings. First, depending on the characteristics of the optimization surface, multiple runs from different starting points might repeatedly visit the same basins of attraction, yielding only a small number of distinct solutions. Second, the solutions found by a local optimization may reflect a local optimum that is arbitrarily worse than the global optimum.

The use of a global optimization method avoids the latter problem, but may still produce a limited set of distinct solutions. One widely used global optimization method is simulated annealing (SA). (See S. Kirkpatrick, C. D. Gelatt, Jr., and M. P. Vecchi. *Optimization by simulated annealing*, SCIENCE, 220:671-680, May 1983). Even though SA tends to avoid getting stuck on local optima (until the temperature parameter reaches the lower end of its schedule), the distinct solutions visited during a single run of the algorithm tend to lack diversity. This is because SA operates on a single candidate solution, applying a perturbation operator that typically makes relatively small moves, so that nearly all of the points visited at lower temperatures can be expected to be from the same local region of the search space. In contrast, genetic algorithms maintain a population of candidate solutions that initially provides a greater diversity of samples from the entire search space. GAs include crossover operators that recombine two selected members of the population, which can often yield an offspring that very different from either parent. Both the large population and the crossover operator provide the GA with the ability to maintain some degree of diversity in its population as the search proceeds. However, selection pressure tends to reduce diversity over time, so that the population tends to converge to a small region of the search space the longer the GA runs. (See John J. Grefenstette, *Optimization of control parameters for genetic algorithms*, IEEE TRANSACTIONS ON SYSTEMS, MAN & CYBERNETICS, SMC-16(1):122-128, January-February 1986). Consequently, the set of near-optimal points visited during a single run of a GA often yields a rather limited set of distinct solutions to many problems (as shown below). Multiple restarts of SA [41] and GA methods can be used to generate multiple near-optimal solutions, but these approaches still risk the repeated exploration of the same areas of the search space. (See David J. Wales and Harold A. Scheraga, *Global optimization of clusters, crystals and biomolecules*, SCIENCE, 285, 1999).

Tracking Dynamic Landscapes: The dynamic penalty function in POGA effectively alters the fitness landscape being optimized by the genetic algorithm, producing an effect equivalent to a slowly changing objective function. Unlike traditional optimization algorithms, a genetic algorithm may use its population to good advantage in tracking changing objective functions. To the extent that the population remains relatively diverse, the genetic algorithm may maintain a balance between exploration (enforced by recombination and mutation) and exploitation (enforced by selection pressure). As a result, a genetic algorithm may track a slowing varying landscape without difficulty. For more rapidly changing environments, some additional mechanisms may be needed. Previous work addresses specific ways to improve the performance of genetic algorithms in dynamic environments. (See John J. Grefenstette, *Genetic algorithms for changing environments*, PARALLEL PROBLEM SOLVING FROM NATURE, 2, at 137-144, 1992; see also H. G. Cobb and John J. Grefenstette, *Genetic algorithms for tracking changing environments*, PROC. FIFTH INTERNATIONAL CONFERENCE ON GENETIC ALGORITHMS, 523-530, 1993). First, the use of periodic global hypermutation, effectively kicking the population into a temporary random exploration mode, was shown to perform well in abruptly changing landscapes. Second, a method that replaced a fixed percentage of the population each generation by random immigrants, i.e., population members that were uncorrelated with the members of the existing population, was shown to be especially effective on gradually shifting landscapes, and resulted in greater search efficiency than a fixed rate of hypermutation on stationary landscapes. It has been shown that hypermutation can be controlled genetically, resulting in a hypermutation rate that adapts to the volatility of the fitness landscape, increasing in response to abrupt shifts and decreasing when the landscape stabilizes. (See John J. Grefenstette, *Evolvability in dynamic fitness landscapes: A genetic algorithm approach*, PROC. 1999 CONGRESS ON EVOLUTIONARY COMPUTATION, 2031-2038, 1999). Such an approach may be very well-suited for optimizing the fitness landscape that changes as a result of the dynamic penalty function in the poly-optimizing genetic algorithm.

Maintaining Diversity in Genetic Algorithms: Even in a traditional optimization setting, the premature convergence of the population in a genetic algorithm is a potential problem. Some of the methods that have been developed for maintaining diversity in the standard genetic algorithm are related to the proposed approach to the poly-optimization problem, including co-evolution and niching. In co-evolutionary genetic algorithms, multiple distinct populations evolve in parallel, usually with some pattern of migration occurring periodically among the populations. (See Mitchell A. Potter, Kenneth A. De Jong, and John Grefenstette, *A coevolutionary approach to learning sequential decision rules*, in *Proceedings of the Sixth International Conference on Genetic Algorithms*, Pittsburgh, Pa., 1995). One effect is that different sub-populations may tend to converge to different optima. By exchanging genetic material through migration, genetic patterns associated with the global optimum have the opportunity to circulate through the co-evolving system, but overall diversity may be more easily maintained than in a single evolving population. However, standard co-evolutionary algorithms do not enforce any explicit tendency toward distinct solutions.

Several investigators have studied maintaining diversity in a single population by imposing niching methods. In one approach, called fitness sharing, the effective fitness assigned to an individual is reduced if the individual is sufficiently close to other individuals in the current population. (See K Deb and David E. Goldberg, *An investigation of niche and species formation in genetic function optimization,* in *Proceedings of the Third International Conference on Genetic Algorithms,* 42-50, San Mateo, Calif., 1989). That is, if a group of individuals is sufficiently similar, then they effective divide the raw fitness among them. If, in addition, members tend to mate with other similar members of the population, then the genetic algorithm can sometimes maintain a set of distinct subpopulation devoted to distinct optima. Two problems reduce the utility of fitness sharing for the poly-optimization problem. First, the number of distinct niches within the population is usually small; only a few stable subpopulation can be maintained. Second, the method does not encourage the search for new optima; once an optimum is found, the niche remains converged to that solution for the remainder of the run.

Multi-objective Optimization: The field of multi-objective optimization is also related to poly-optimization. In multi-objective optimization, the goal is to simultaneously optimize several separate objective functions. (See Carlos A. Coello Coello, *An updated survey of evolutionary multiobjective optimization techniques: State of the art and future trends,* in 1999 *Congress on Evolutionary Computation,* 3-13, 1999). For example, in engineering design, one may want to optimize several different goals including cost, performance, ease of manufacturing, and so on. Since such goals often conflict, multi-objective optimization methods seek a set of Pareto-optimal points, that is, solutions that are not dominated along all objectives by any other solution. Among the earliest genetic algorithms developed for multi-objective optimization was the Vector Evaluated Genetic Algorithm (VEGA), an extension of the GENESIS program. (See J. D. Schaffer and John J. Grefenstette, *Multi-objective learning via genetic algorithms,* in *Proceedings of the Ninth International Joint Conference on Artificial Intelligence,* 593-595, 1985). While this field shares the goal of finding multiple distinct solutions, it differs from the poly-optimization problem by the presence of multiple objectives. In poly-optimization, there may a single objective function for which it desired to find multiple distinct solutions. Poly-optimization may also be applied to multiple-objective problems, but multiple-objective optimization methods do not seek solution that are distinct in the domain.

Figure 9:
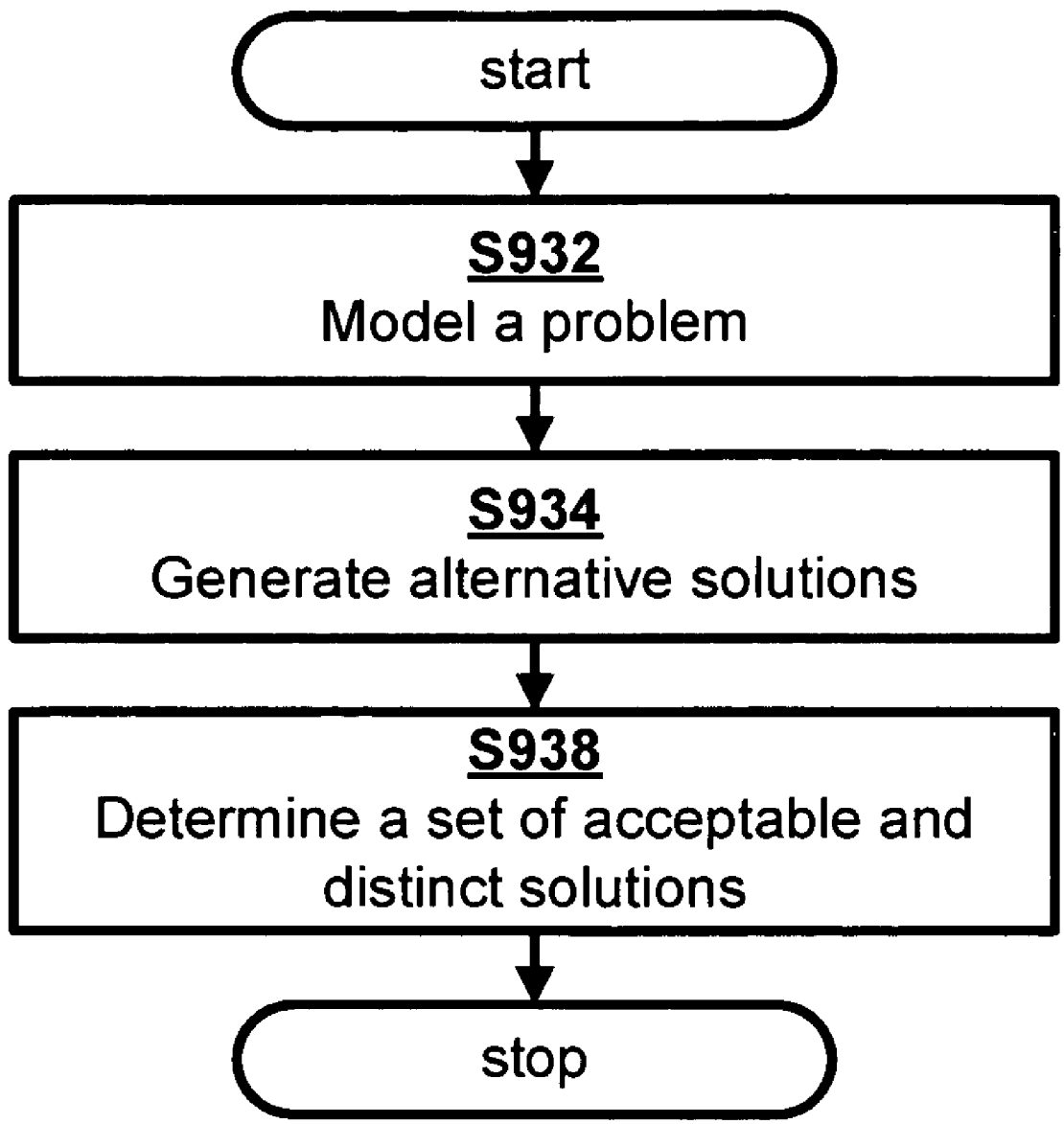
FIG. 9 is a flow diagram of an aspect of an embodiment of the present invention.
Figure 10:
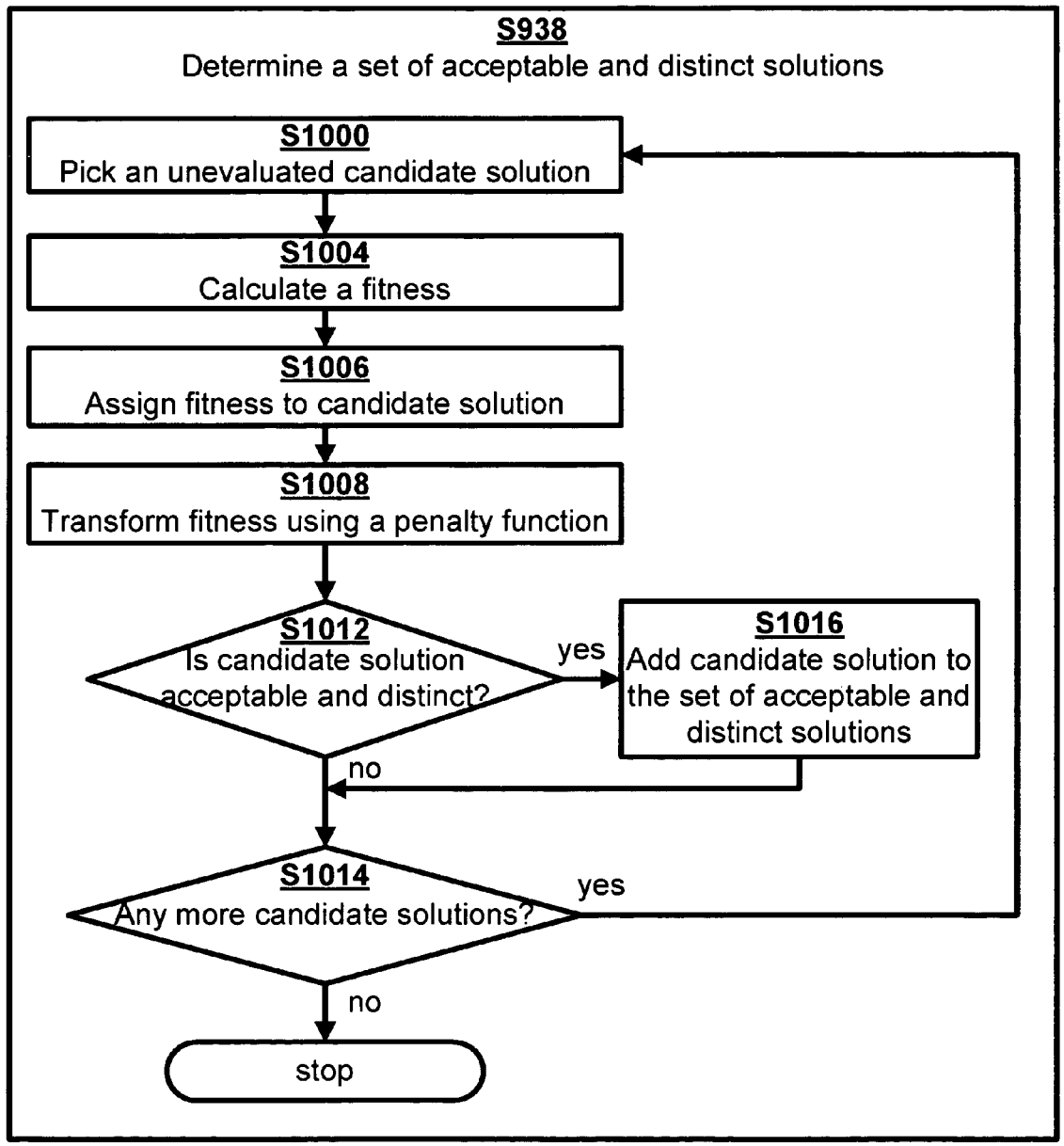
FIG. 10 is a detailed flow diagram of an aspect of an embodiment of the present invention.

Example Embodiment: FIGS. 9 and 10 are flow diagrams of an aspect of an embodiment of the present invention. As shown, a problem may be modeled at step S932 as an objective function, generating a multitude of candidate solutions for the objective function S936; and determining a set of acceptable and distinct solutions S938. The set of acceptable and distinct solutions may be determined for each of the multitude of points. The top of the double loop includes picking an unevaluated candidate solution at step S1000. At step S1004, a fitness may be calculated using the objective function. Next, each fitness may be assigned to its candidate solution at step S1006 and then transformed using a penalty function at step S1008. A determination of whether the candidate solution is acceptable and sufficiently distinct may be made at step S1012. If the candidate solution is acceptable and sufficiently distinct, then the candidate solution may be added to the set of acceptable and distinct solutions at step S1016. Finally, if there are any more candidate solutions to be evaluated (see step S1014), control is passed back to step S1000.

The search space may include a multitude of points. These points may be represented by numerous methods such as: n-dimensional numerical vectors, arbitrary bit-strings, combinatorial objects; spaces of logical rules; and computer programs. During the search for candidate solutions, the focus may shift to alternative regions of the search space.

The invention may also define a distance metric over the search space. The distance metric may be natural distance measure such as: a Hamming distance for bit strings, a Euclidean distance for real-valued vectors, an edit distance for permutations, a phylogenetic tree, or an RMS distance between corresponding atoms. Users may define the distance metric in order to determine whether candidate solutions are sufficiently distinct to meet the user's needs.

The objective function may be: high-dimensional, multi-dimensional, multimodal, discontinuous, or the like. In some embodiments, it may be preferable to maximize the objective function. The objective function is preferably capable of mapping structures in a search space. Structures may include: a "genotypic" data structure, a bit string structure; a real-valued vector structure, a permutated structure, or the like.

Previously visited points may be considered when calculating a fitness. The fitness may be used by a genetic algorithm to decide which members of the current population will be selected to generate offspring in the next generation. The fitness function may also be scaled to maintain a selective pressure.

The fitness of a point may be reduced. The reduction may be by the presence of previously visited points within a δ-neighborhood, or when a point is sufficiently similar to a previously visited point. This reduction may be done using a static penalty function or a dynamic that can vary along several dimensions. The dimensions may include: the definition of at least one distance metric, the form of at least one pairwise penalty, absolute vs. relative penalties, the number of neighbors contributing to at least one penalty, or the like.

The range of the penalty function may be restricted. For example, in some applications, it may be useful that the penalty function only penalizes points in a region of acceptable solutions. Or, the penalty function may only include a penalty associated with the nearest neighbor. The penalty function may also be an absolute dynamic penalty defined by $f(x, t)=g(x)-p(x, t)$ or a relative dynamic penalty defined by $f(x, t)=g(x)*(1-p(x, t))$. The penalty function may be summed over all previously visited points.

Many possible penalty functions may be used. The penalty function may be defined in terms of a pairwise penalty function $r(u, v)$. For example, the penalty function for a direct hit on a previously visited point be $r(u, v)=A*(1-d(u, v)/B)$ or $r(u, v)=A*(1-(d(u, v)/B)^2)$. Additionally, the pairwise penalty may: reduce the fitness in the vicinity of previously explored regions of the search space, specify the size of the penalty for a direct hit, decrease as a function of distance, or the like. The number of neighbors that are taken into account in computing the pairwise penalty may vary.

The set of acceptable and distinct solutions is defined the maximal set of $H=\{x_i \epsilon X | g(x_1) \geq \epsilon$ and $d(x_i, x_j) \geq \delta$ for all $x_j \epsilon H$, $j \neq i\}$. The candidate solution may be considered acceptable if its objective function value is greater than or equal to an acceptance parameter value. Two candidate solutions may be sufficiently distinct if the distance between them is greater than or equal to a specified distance parameter value.

The invention may also include calculating an efficiency metric. This calculation preferably considers the number of acceptable, distinct solutions found in the search space, the number of the multitude of points evaluated using a hit rate calculation. Additionally, the efficiency metric may also consider the relative quality of the acceptable and distinct solutions found in the search space.

It may be desirable to record all or part of the acceptable solutions for further analysis. For example, embodiments of the present invention may maintain a history of every point visited during a search.

Figure 11:
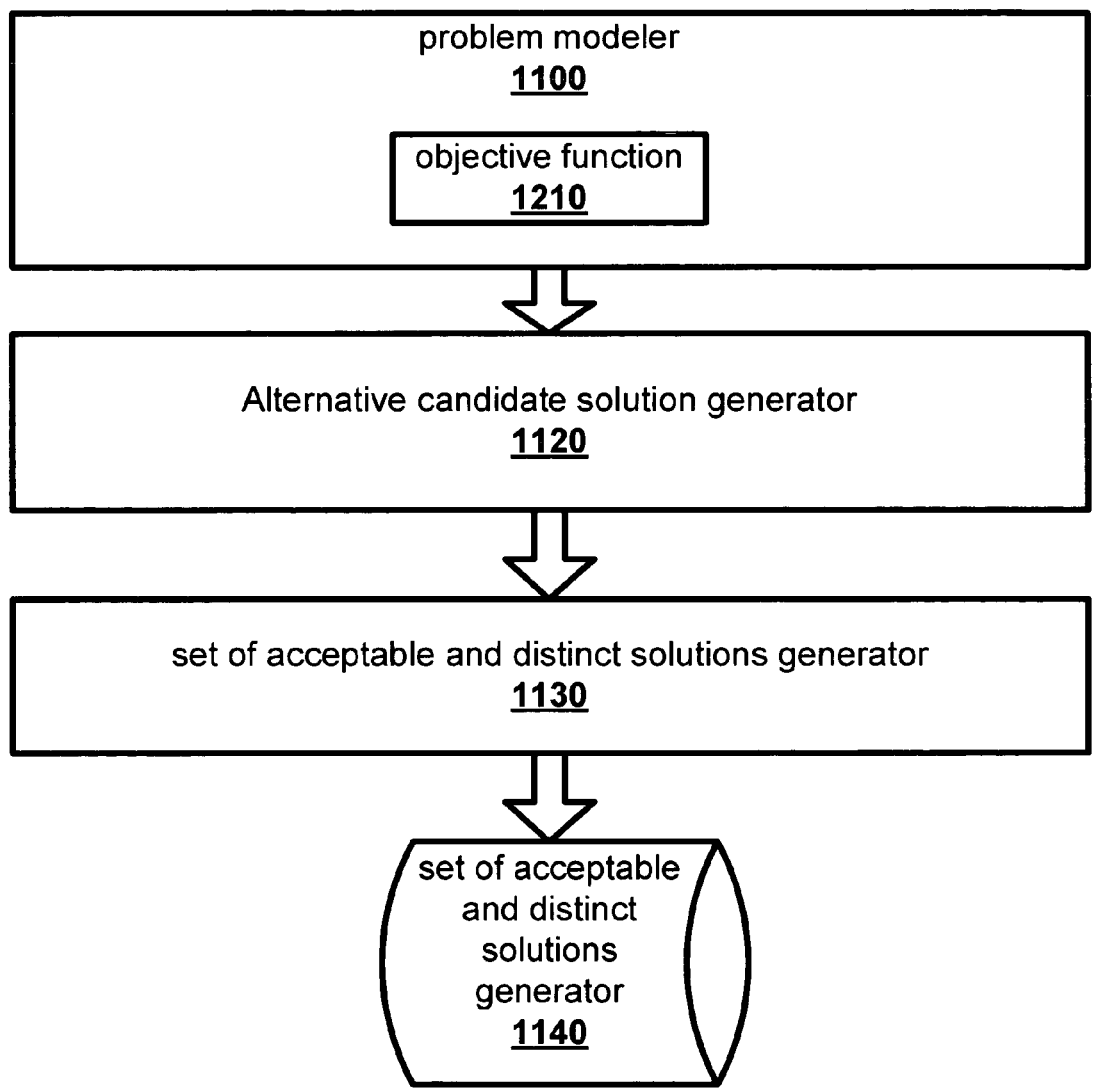
FIG. 11 is a block diagram of an aspect of an embodiment of the present invention.

The block diagram in FIG. 11 shows a block diagram of a possible implementation of an aspect of an embodiment of the present invention. As shown, this embodiment includes a problem modeler 1100, a candidate solution generator 1120, and a set of acceptable and distinct solutions generator 1140. The problem modeler 1100 is capable of modeling a problem as an objective function 1210, wherein the objective function 1210 is capable of mapping structures in a search space that includes a multitude of points. The candidate solution generator 1120 is capable of generating a multitude of candidate solutions using the objective function 1210. For each of the candidate solutions at each of the multitude of points, the set of acceptable and distinct solutions generator 1140: calculates a fitness using the objective function 1210; assigns each fitness to its candidate solution; transforms the fitness using a penalty function; determines if the candidate solution is acceptable; determines if the candidate solution is sufficiently distinct; and then adds the candidate solution to a set of acceptable and distinct solutions 1150 if the candidate solution was determined to be acceptable and distinct.

The foregoing descriptions of the preferred embodiments of the present invention have been presented for purposes of illustration and description. They are not intended to be exhaustive or to limit the invention to the precise forms disclosed, and obviously many modifications and variations are possible in light of the above teaching. The illustrated embodiments were chosen and described in order to best explain the principles of the invention and its practical application to thereby enable others skilled in the art to best utilize the invention in various embodiments and with various modifications as are suited to the particular use contemplated. For example and as suggested earlier, one skilled in the art will recognize that the present invention may also be applied to multiple-objective problems.

What is claimed is:

1. A computer-implementable method for finding multiple solutions to a physical problem relating to computational biology, said method implemented using a set of instructions storable in a computer memory upon which execution of said instructions causes a computer to perform the actions comprising:
   a) modeling said physical problem as an objective function, said objective function configured for mapping structures in a search space having a multitude of points by defining a distance metric over said search space, wherein input data for said distance metric is specific to protein folding, the data comprising structural distance measurement data between corresponding atoms;
   b) generating a multitude of candidate solutions for said objective function; and
   c) for each of said candidate solutions at each of said multitude of points, determining a set of acceptable and distinct solutions by:
      i) calculating a fitness using said objective function, wherein said fitness is scaled to maintain a selective pressure;
      ii) assigning each of said fitness to its candidate solution;
      iii) transforming said fitness using a penalty function;
      iv) determining if said candidate solution is acceptable;
      v) determining if said candidate solution is sufficiently distinct; and
      vi) adding said candidate solution to said set of acceptable and distinct solutions if said candidate solution was determined to be acceptable and distinct.

2. A method according to claim 1, further including the step of calculating an efficiency metric, said calculation considering the number of acceptable, distinct solutions found in said search space and the number of said multitude of points evaluated.

3. A method according to claim 2, wherein said step of "calculating an efficiency metric" uses a hit rate calculation.

4. A method according to claim 1, wherein said objective function is multidimensional.

5. A method according to claim 1, wherein said step of "calculating a fitness" considers previously visited points.

6. A method according to claim 1, further including the step of reducing the fitness of a point using a dynamic penalty function.

7. A method according to claim 1, further including the step of reducing the fitness of a point if it is sufficiently similar to a previously visited point.

8. A method according to claim 1, wherein said method shifts its focus to alternative regions of the search space.

9. A method according to claim 1, wherein all acceptable solutions are recorded for further analysis.

10. A method according to claim 1, wherein said search space is represented by one of the following:
    a) n-dimensional numerical vectors;
    b) arbitrary bit-strings;
    c) combinational objects;
    d) space of logical rules; and
    e) computer programs.

11. A method according to claim 1, wherein said objective function is one of the following:
    a) high-dimensional;
    b) multimodal; and
    c) discontinuous.

12. A method according to claim 1, wherein said objective function is maximized.

13. A method according to claim 1, wherein said distance metric is defined by a user in order to determine whether candidate solutions are sufficiently distinct to meet the user's needs.

14. A method according to claim 1, wherein said set of acceptable and distinct solutions is defined the maximal set of $$H=\{x_i \in X | g(x_i) \geq \in \text{ and } d(x_i,x_j) \geq \delta \text{ for all } x_j \in H, j \neq \}.$$

15. A method according to claim 1, wherein said candidate solution is acceptable if its objective function value is greater than or equal to an acceptance parameter value.

16. A method according to claim 1, wherein two candidate solutions are sufficiently distinct if the distance between them is greater than or equal to a specified distance parameter value.

17. A method according to claim 1, further including the step of calculating an efficiency metric, said calculation considering the relative quality of the acceptable and distinct solutions found in said search space.

18. A method according to claim 1, wherein said fitness is used by a genetic algorithm to decide which members of the current population will be selected to generate offspring in the next generation.

19. A method according to claim 1, wherein said penalty function is defined in terms of a pairwise penalty function r(u, v).

20. A method according to claim 19, wherein said pairwise penalty reduces said fitness in the vicinity of previously explored regions of said search space.

21. A method according to claim 19, wherein said pairwise penalty function specifies the size of the penalty for a direct hit.

22. A method according to claim 19, wherein said pairwise penalty function decreases as a function of distance.

23. A method according to claim 19, wherein said penalty for a direct hit on a previously visited point is $r(u, v)=A*(1-d(u, v)/B)$.

24. A method according to claim 19, wherein said penalty for a direct hit on a previously visited point is $r(u, v)=A*(1-(d(u, v)/B)^2)$.

25. A method according to claim 19, wherein the number of neighbors that are taken into account in computing said pairwise penalty may vary.

26. A method according to claim 1, wherein said penalty function is a dynamic penalty function that varies along several dimensions.

27. A method according to claim 26, wherein said dimension includes at least one of the following:
   a) the definition of at least one distance metric;
   b) the form of at least one pairwise penalty;
   c) absolute vs. relative penalties; and
   d) the number of neighbors contributing to at least one penalty.

28. A method according to claim 27, wherein said distance metric is a natural distance measure including at least one of the following:
   a) a Hamming distance for bit strings;
   b) a Euclidean distance for real-valued vectors;
   c) an edit distance for permutations;
   d) a phylogenetic tree; and
   e) an RMS distance between corresponding atoms.

29. A method according to claim 1, wherein at least one of said structures is one of the following:
   a) a "genotypic" data structure;
   b) a bit string structure;
   c) a real-valued vector structure; and
   d) a permutated structure.

30. A method according to claim 1, wherein said penalty function is an absolute dynamic penalty defined by $f(x, t)=g(x)-p(x, t)$.

31. A method according to claim 1, wherein said penalty function is a relative dynamic penalty defined by $f(x, t)=g(x)*(1-p(x, t))$.

32. A method according to claim 1, wherein the range of said penalty function is restricted.

33. A method according to claim 1, wherein only points in a region of acceptable solutions are penalized.

34. A method according to claim 1, wherein said penalty function only includes a penalty associated with the nearest neighbor.

35. A method according to claim 1, wherein said penalty function sums over all previously visited points.

36. A method according to claim 1, wherein a history of every point visited during a search is stored.

37. A method according to claim 1, wherein the fitness of each point may be reduced by the presence of previously visited points within a $\delta$-neighborhood.

38. A computational system configured for executing instructions for finding multiple solutions to a physical problem relating to computational biology comprising:
   a) a problem modeler configured for modeling said physical problem as an objective function, said objective function configured for mapping structures in a search space having a multitude of points by defining a distance metric over said search space, wherein input data for said distance metric is specific to protein folding, the data comprising structural distance measurement data between corresponding atoms;
   b) a candidate solution generator configured for generating a multitude of candidate solutions using said objective function; and
   c) a set of acceptable and distinct solutions generator that for each of said candidate solutions at each of said multitude of points is configured for:
      i) calculating a fitness using said objective function, wherein said fitness is scaled to maintain a selective pressure;
      ii) assigning each of said fitness to its candidate solution;
      iii) transforming said fitness using a penalty function;
      iv) determining if said candidate solution is acceptable;
      v) determining if said candidate solution is sufficiently distinct; and
      vi) adding said candidate solution to said set of acceptable and distinct solutions if said candidate solution was determined to be acceptable and distinct.

39. A system according to claim 38, further including an efficiency calculator configured for calculating a efficiency metric, said calculation considering the number of acceptable and distinct solutions found in said search space and the number of said multitude of points evaluated.

* * * * *